Jan. 10, 1967   F. ROBBIANO   3,297,863
PROJECTOR FOR MOTOR VEHICLES
Filed Aug. 17, 1964
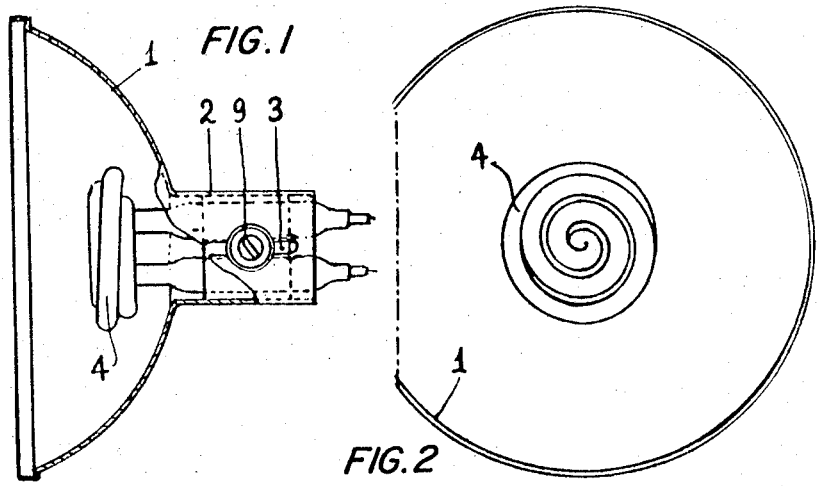
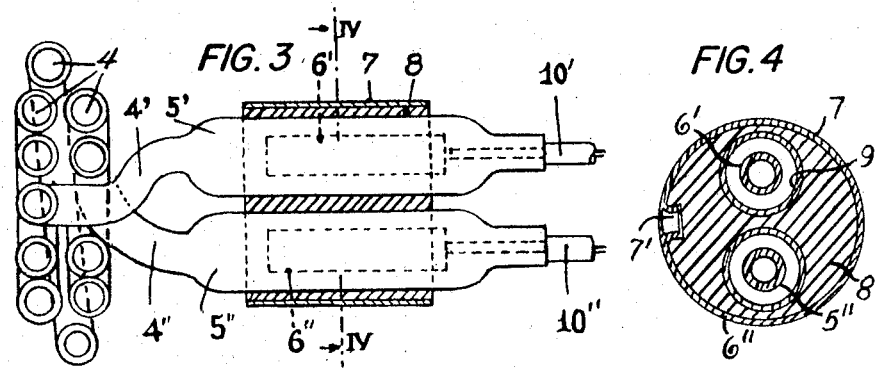
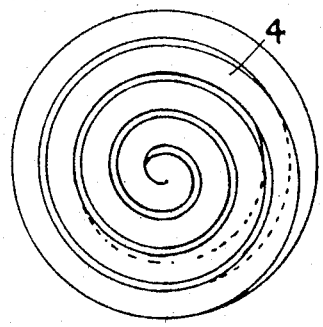
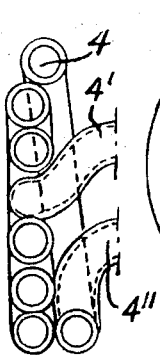
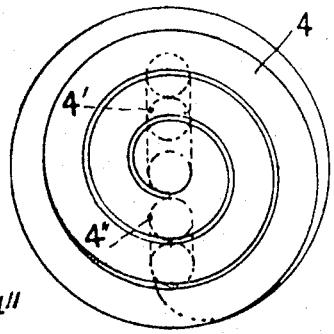
INVENTOR
FRANCESCO ROBBIANO
BY Richards & Geier
ATTORNEYS

# United States Patent Office 3,297,863
Patented Jan. 10, 1967

3,297,863
PROJECTOR FOR MOTOR VEHICLES
Francesco Robbiano, 19 Corso Chieti, Turin,
Piedmont, Italy
Filed Aug. 17, 1964, Ser. No. 389,976
1 Claim. (Cl. 240—11.4)

This invention refers to projectors for motor vehicles.

An object of the invention is to provide a projector of this kind with which a lighting is obtained which is strong and penetrating and, at the same time, does not dazzle drivers coming in the opposite direction who are struck by the stream of light generated by the projector. This and many other advantages of said projector originate chiefly from the adoption of a source of light consisting of a high voltage rarefied gas discharge lamp which enables the attainment of a very powerful lighting source, although with a reduced specific brilliancy, contrary to what happens when incandescent lamps are used, in which the tendency is towards a dot-shaped source with enormously stronger brilliancy and, consequently, with very high dazzling effect, said lamp being peculiarly designed and peculiarly arranged in the projector which, moreover, presents constructional peculiarities.

The projector according to the present invention is described in the following with reference to the enclosed drawings which, by way of a nonrestrictive example, illustrate a preferred embodiment of the invention. In the drawings:

FIG. 1 is an axial section of the main components of the projector;

FIG. 2 is a front view of the same projector;

FIGS. 3 to 5 show on a larger scale the lamp in longitudinal section;

FIGS. 6 and 7 show another embodiment of the lamp.

No. 1 indicates the so-called "parabolic" reflector, although it may be generated by a curve which is not exactly parabolic but which is practically and experimentally corrected on the basis of the particular form of the light source. This reflector which, on the whole, does not differ essentially from the known ones, varies from the latter chiefly in that its central portion forms a cylindrical jacket 2 which protrudes backward.

Said jacket is destined to act as a lamp-socket, and shows an opening 3 made along a generatrix and designed to accommodate a screw for fixing the lamp, which will be dealt with further on.

This reflector is fitted in an essentially conventional manner on the housing of the projector, which housing is not illustrated inasmuch as it obviously does not have any peculiar feature compared to the known ones.

As already stated, jacket 2 acts as a lamp socket, the lamp being formed and fitted as follows:

The main portion of the lamp consists of a discharge tube 4 wound as a plane spiral so as to form one or more planes which, as a whole, form a disc which, in the example, has a diameter equal to approximately one third of the opening of the projector.

This ratio is not critical, but is named merely in order to give an idea of the order of magnitude of the light source of the projector according to the invention compared to that of a conventional projector with incandescent lamp, which tends to be dot-shaped and the diameter of which is approximately 20 times smaller, so that it requires a 400 times greater specific brilliancy.

The two ends 4'–4" of the discharge tube extend into two bulbs 5'–5" which contain the electrodes 6'–6", and the two bulbs are arranged in parallel inside a cylindrical ring-holder 7 to which they are secured by means of filling material 8.

Ring-holder 7 has, on its side, a threaded opening 7' into which is turned the fixing screw 9 that passes into opening 3 thereby permitting the adjustment of the distance of the light source 4 from the reflector and its locking in a convenient position.

Electrodes 6'–6" are connected with conductors 10'–10" fed by any appropriate source of electric power having the appropriate voltage and frequency.

The practical tests carried out have revealed that a pair of projectors of the type described supplies a lighting having a depth comparable to that of a pair of driving beam projectors, whilst the glaring effect is lower than that of an anti-dazzle beam projector having the same power.

The constructional details explained above are given by way of example, but do not restrict the scope of the invention, the particulars of which may, on the contrary, be varied within broad limits depending on the requirements of the general practice or of special cases, without exceeding the scope of the invention.

For instance, the constructional shape of the lamp may also differ considerably from the one that has been illustrated herein, without ceasing to constitute a high-voltage rarefied gas discharge light source under such conditions that, as a whole, it forms a more or less plane light-emitting disc. The same applies to the fitting of the lamp in the reflector, although the mode of fitting illustrated herein is actually believed to be the most advantageous.

Having thus described my invention, what I claim is:

A projector for a motor vehicle, said projector comprising a reflector having a curved body and a rearwardly extending cylindrical jacket enclosing a central opening of the reflector body and constituting a lamp socket; a lamp having a spiral discharge tube portion located within said reflector body, two parallel bulbs integral with opposed ends of said spiral discharge tube and extending through said jacket, electrodes within said bulbs, and conductors connected with said electrodes and extending out of said bulbs; a filling enclosing said bulbs, a cylindrical ring-holder enclosing said filling and fitting within said jacket, said jacket having a longitudinal opening and said ring-holder having an opening aligned with a portion of the first-mentioned opening, and a fixing screw extending through said openings for adjusting the location of the lamp relatively to the reflector.

References Cited by the Examiner
UNITED STATES PATENTS 1,981,903 11/1934 Cadieux _____ 240—11.4 X
2,613,313 10/1952 Weeks _____ 240—11.4 X NORTON ANSHER, Primary Examiner.

C. R. RHODES, Assistant Examiner.